Dec. 11, 1962  B. BARÉNYI  3,068,042
ARRANGEMENT OF MOTOR VEHICLE BODY ELEMENTS
Filed March 21, 1960
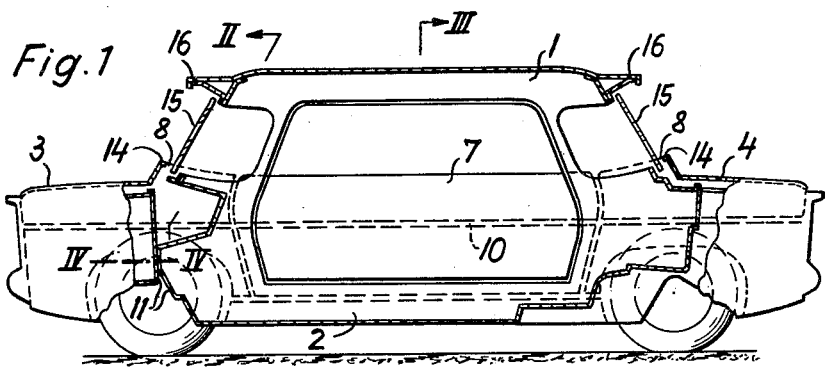
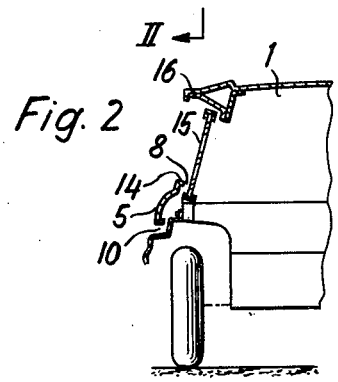
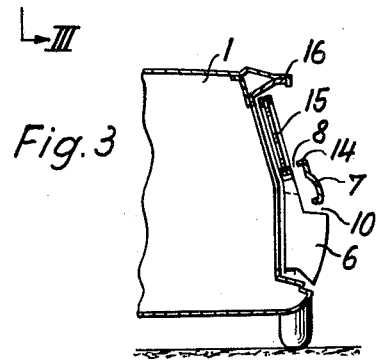
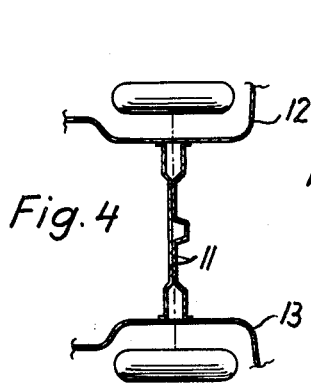
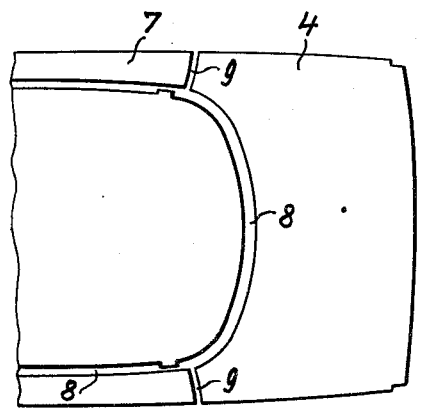
INVENTOR
BÉLA BARÉNYI
BY Dicke, Craig & Freudenberg
ATTORNEYS

United States Patent Office 3,068,042
Patented Dec. 11, 1962

3,068,042
ARRANGEMENT OF MOTOR VEHICLE BODY ELEMENTS
Béla Barényi, Stuttgart-Vaihingen, Germany, assignor to Daimler-Benz Aktiengesellschaft, Stuttgart-Unterturkheim, Germany
Filed Mar. 21, 1960, Ser. No. 16,376
Claims priority, application Germany Mar. 24, 1959
2 Claims. (Cl. 296—28)

The present invention relates to improvements in automobiles, and particularly in a passenger car of the type which is provided with a central upper body portion which is bordered in front and/or at the rear thereof by hoodlike covers or doors, and at the sides by door coverings or solid side walls.

It is an object of the present invention to provide a car body which may be manufactured and assembled at a considerable reduction in costs as compared with previous automobiles by designing the same in such a manner that a considerable amount of fitting work will become unnecessary.

Another object of the invention is to provide a car body in which the glass edges of the windshield and windows, as well as the mounting parts thereof are disposed entirely independent of the sheathing parts.

These objects are attained according to the invention by separating the sheathing parts, such as hoods, lids, doors, door coverings, and the like, from the central upper body portion of the car by providing an intermediate gap all around the latter between it and these sheathing parts. The central body portion may then be bordered by an engine or a baggage compartment or both and at the sides by two sliding doors which are provided with door coverings, and the central body portion may then be separated from these parts by an air gap.

According to another feature of the invention, the hoods or lids and/or the door coverings terminate at their lower ends into horizontal joints which are preferably disposed within the same plane and may be perfectly straight. In such event, the rain water which enters from the outside into the continuous groove around the central body portion is preferably conducted in such a manner that at least a considerable part thereof will run off through the lower horizontal joints at the sides of the car body. All, or at least a large part of the water which may enter around the windshield of the car may run off downwardly to the outside through a gap between a double wall separating the passenger compartment and the compartment in front thereof. This double wall is preferably arranged between the two wheel enclosures.

Apart from the important fact as previously mentioned that by means of such a body structure the costs of production of the car will be considerably reduced because the various parts of the body no longer have to be accurately fitted, numerous other advantages are attained by such a body structure. Thus, for example, it will be easily possible to alter the outer appearance of the car and thus to create different car models by changing the sheathing parts. Furthermore, chromium strips and the like for masking inaccurate and unattractive rubber liners for mounting the windows are no longer required. Another important advantage which is now attained is the fact that at certain types of damages to the car body, the mountings of the window glasses and even the glasses themselves will remain undamaged which reduces the costs of maintenance and increases the watertightness of the car. The gap all around the central body portion of the car furthermore permits an invisible arrangement of the elements of windshield wipers, hot-air outlets, spray nozzles, and the like, and also of the mounting elements of curtains or the like.

These objects, features, and advantages of the invention will become further apparent from the following detailed description of one preferred embodiment thereof, particularly when the same is read with reference to the accompanying drawings, in which:

FIGURE 1 shows a central longitudinal section of a car according to the invention;

FIGURE 2 shows a cross section of one side of a car taken along line II—II of FIGURE 1;

FIGURE 3 shows a cross section of one side of a car taken along line III—III of FIGURE 1;

FIGURE 4 shows a cross section taken along line IV—IV of FIGURE 1; while

FIGURE 5 shows a top plan view of the rear part of the car according to FIGURE 1.

Referring to the drawings, the passenger car according to the invention has a central upper part 1 on the car body 2, and at the front thereof a hood 3 for covering the engine compartment and at the rear thereof a lid 4 for covering the baggage compartment. FIGURE 2 illustrates the side portion 5 which forms a part of the hood of the engine compartment, while FIGURE 3 shows the door 6, which in this particular embodiment of the invention is made in the form of a sliding door having suitable support means (not shown) enabling the door to be initially moved transversely of the vehicle either before or essentially simultaneously with the sliding movement of the door. Hood 3 and lid 4, as well as hood portion 5 and the door covering 7 are separated from the central upper part 1 by a continuous gap or slot 8 extending all around the central upper part 1.

As illustrated in FIGURE 5, gap 8, as seen in a plan view, has a substantially elliptical shape which is interrupted by four substantially radially directed gaps or joints 9, two of which are shown in FIGURE 5. Hood 3, lid 4, and door coverings 7 terminate at their lower sides in straight horizontal gaps 10 through which rain water may flow off which has entered along the sides of the car into gap 8.

FIGURE 4 diagrammatically illustrates one preferred embodiment of the front axle of the car according to the invention. The passenger and engine compartments are separated by a double wall 11 which closes these two compartments, as also shown in FIGURE 1. The rain water which has entered through gap 8 at the front windshield passes largely or entirely downwardly and to the outside through the gap between this double wall 11. In the embodiment as illustrated, the double wall 11 is installed between the two wheel enclosures 12 and 13.

FIGURES 1 to 3 show that the upper edges 14 of the covering parts which surround the glass surfaces 15 and are spaced therefrom by the gap 8 are disposed at an angle to these glass surfaces which is preferably made the same along the entire periphery of the central upper part 1 of the car body. The top of the central part 1 is also provided with an outwardly projecting edge 16 which is disposed at an angle to the glass surfaces 15 and preferably also extends at such an angle all around the central part 1.

Although my invention has been illustrated and described with reference to the preferred embodiments thereof, I wish to have it understood that it is in no way limited to the details of such embodiments but is capable of numerous modifications within the scope of the appended claims.

Having thus fully disclosed my invention, what I claim is:

1. A passenger motor vehicle comprising a vehicle superstructure having a central body portion, said central body portion being provided with at least one door aperture, a door positioned within each such aperture, said door including an upper portion of reduce thickness and a lower portion of larger thickness integral therewith, outer sheathing means to substantially cover said upper portion of reduced thickness and spaced from said upper portion to provide an upper gap therebetween at the upper edge of said sheathing means, the lower edge of said sheathing means being spaced from said lower portion of larger thickness and providing a lower gap therebetween, said upper and lower gaps being in communication whereby rain water and the like entering at said upper gap may drain out through said lower gap.

2. A passenger motor vehicle according to claim 1, further comprising windshield means mounted in said central body portion, and hood means spaced slightly at one end thereof from said windshield means to provide gap means therebetween, said gap means essentially joining with said upper gap of said door as viewed from above said vehicle.

References Cited in the file of this patent

UNITED STATES PATENTS

| | | |
|---|---|---|
| 2,383,575 | Wernig | Aug. 28, 1945 |
| 2,387,317 | Cunnington | Oct. 23, 1945 |
| 2,459,502 | Craig | Jan. 18, 1949 |
| 2,589,493 | Henry | Mar. 18, 1952 |
| 2,767,014 | Wilfert et al. | Oct. 16, 1956 |
| 2,774,998 | Kiekert | Dec. 25, 1956 |
| 2,797,953 | Barényi | July 2, 1957 |
| 2,797,955 | Wilfert | July 2, 1957 |
| 2,886,373 | Barényi | May 12, 1959 |
| 2,929,656 | Adell | Mar. 22, 1960 |
| 2,998,280 | Barényi | Aug. 29, 1961 |

FOREIGN PATENTS

| | | |
|---|---|---|
| 389,061 | Great Britain | May 28, 1931 |